United States Patent
Garrote et al.

(10) Patent No.: US 12,164,975 B2
(45) Date of Patent: Dec. 10, 2024

(54) FEDERATED DISTRIBUTED MUTATION

(71) Applicant: Salesforce, inc., San Francisco, CA (US)

(72) Inventors: Antonio Garrote, San Francisco, CA (US); Patricio Barletta, Brentwood, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/818,826

(22) Filed: Aug. 10, 2022

(65) Prior Publication Data

US 2024/0054026 A1    Feb. 15, 2024

(51) Int. Cl.
*G06F 9/54* (2006.01)

(52) U.S. Cl.
CPC .............. *G06F 9/541* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 2020/0125455 A1* | 4/2020 | Neelakanteshwar | ....................... G06F 9/4451 |
| 2020/0311085 A1* | 10/2020 | Lucas | .................. G06F 16/9024 |
| 2021/0224165 A1* | 7/2021 | Jablonski | ............ H04L 41/5096 |
| 2021/0294679 A1* | 9/2021 | Thakur | .................... G06F 8/315 |
| 2023/0095620 A1* | 3/2023 | Wang | .................. G06F 11/1469 714/2 |
| 2023/0224376 A1* | 7/2023 | Little | .................. G06F 16/2379 709/230 |

OTHER PUBLICATIONS

Yang, Meixia, and Ming Huang. "An microservices-based openstack monitoring tool." in 2019 IEEE 10th International Conference on Software Engineering and Service Science (ICSESS), pp. 706-709. IEEE, 2019. (Year: 2019).*

* cited by examiner

*Primary Examiner* — Frank D Mills
(74) *Attorney, Agent, or Firm* — Holland & Hart LLP

(57) ABSTRACT

Methods, systems, and devices for data processing are described. The method may include generating a federated application programming interface (API) from a plurality of data sources. One or more of the plurality of data sources may include an annotated data schema that defines one or more API endpoints for performing a distributed mutation of the plurality of data sources according to a supported distributed transaction protocol. The method may include receiving, via a single call to a single field of the federated API, a request at the federated API to perform a distributed mutation on the plurality of data sources. The method may include orchestrating, via a federation management service and the one or more API endpoints, a plurality of mutation calls to the plurality of data sources according to the distributed transaction protocol.

17 Claims, 12 Drawing Sheets

FEDERATED DISTRIBUTED MUTATION

FIELD OF TECHNOLOGY

The present disclosure relates generally to data processing, and more specifically to federated distributed mutation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant data processing system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platform scenarios, the cloud platform, a server, or other device may manage operations across data sources associated with a federated API. However, such methods may be improved.

DETAILED DESCRIPTION

Figure 1:
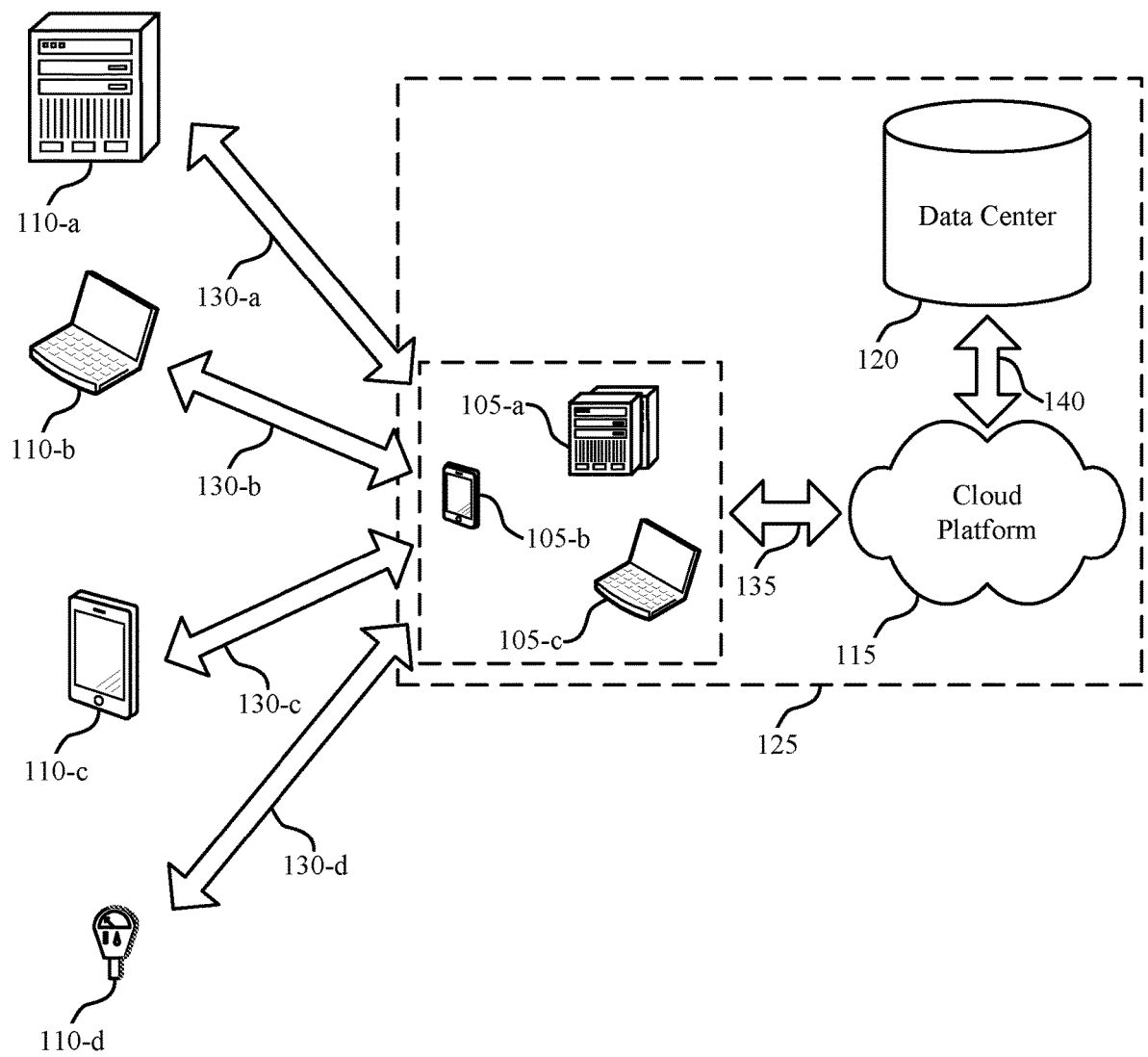
FIG. 1 illustrates an example of a data processing system that supports federated distributed mutation in accordance with examples as disclosed herein.

A federation service may link multiple data sources (e.g., APIs, databases, etc.) together for unified querying, which is a safe operation because querying multiple data sources via a federated API does not impact the source data, and can be run multiple times to yield the same result. Mutation refers to the operation of updating existing data or the insertion of new data into an API or other data source. A technical challenge with mutation using a federated API is ensuring consistency of all the updates across the multiple data sources. For example, a single mutation to a federated API may involve mutations to multiple data sources, and one or more of the mutations to the data sources may fail, while others succeed. However, there are currently no techniques to ensure that all the data source mutations were successful or techniques for managing the scenario where some mutations fail.

The subject matter described herein includes techniques for annotating the schemas of data sources of a federated API to advertise the capabilities and the rollback mechanisms supported by the data sources in the case of a distributed mutation operation. In some examples, the schemas of the data sources may be annotated to indicate mutable operations (e.g., a POST operation) supported by the data source, the type of transaction protocol supported by the data source (e.g., SAGAS or two phase commit (2PC)), identifiers that uniquely identify a mutation transaction, and a corresponding rollback endpoint that defines how the API can undo the mutable operation in case of an error (e.g., a compensating transaction in the case of a SAGAS protocol). A federation management service generates a federated API from the data sources having the annotated schemas, and aggregates the multiple endpoints from the data sources into a single field in the schema of the federated API. At runtime, a request to perform a distributed mutation via the single field of the federated API is orchestrated by a gateway of the federation management service to manage the plurality of calls to the plurality of data sources according to the transaction protocol that is supported by the data source. The gateway also monitors for errors and manages the rollback protocols of the data sources to ensure that the data sources are rolled back to their previous state if a mutation operation somewhere else in the sequence fails. In this way, the subject matter described herein provides techniques for ensuring that distributed operations across data sources (e.g., APIs in a federated API) were successful and rolling back distributed operations that result in errors.

In some examples, an annotated data schema may include different elements that may aid in performing distributed mutations, including a path parameter that indicates a location of a rollback endpoint and an input for invoking a rollback operation, a path parameter that indicates a location of a transaction identifier (e.g., a transaction that is to be rolled back), a payload alias that identifies a data source for receiving a payload for a distributed mutation. In some examples, the federation management service may determine whether respective data sources support a distribution transaction protocol and may use such information to generate a federated API.

Aspects of the disclosure are initially described in the context of an environment supporting an on-demand database service. Aspects of the disclosure are then illustrated in the context of computing environments and process flows. Aspects of the disclosure are further illustrated by and described with reference to apparatus diagrams, system diagrams, and flowcharts that relate to federated distributed mutation.

FIG. 1 illustrates an example of a system 100 for cloud computing that supports federated distributed mutation in accordance with various aspects of the present disclosure.

The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some implementations, the cloud platform 115 may support the operation of a federation management service that may manage the federation of one or more data sources (e.g., stored at the data center 120 or other storage). The data sources may include RESTful APIs, Async APIs, gRPC APIs, databases, or the like. The data sources may be annotated to include information associated with distributed operations that may be performed across the different data sources. For example, such information may include identifiers for transactions performed on the data source and methods or endpoints for performing a rollback operation. Such information may further define one or more aspects, characteristics, or operations of the rollback operation that may be performed as a result of calling the rollback operation. In some examples, a rollback operation may be referred to by other terminology, such as a compensating transaction. The federation management service may receive a single call or other user input (e.g., from clients 105) indicating a rollback operation and the federation management service may perform the rollback operation across the different data sources according to the annotated data schema of each data source.

In other approaches, distributed operations may be performed to read data across different data sources. Such operations may not make changes to the data sources and, as such, consistency across the data sources is maintained. However, in cases where a distributed operation includes one or more mutations (e.g., a change, an addition, a deletion, or other data processing operation), consistency may not be maintained by these other approaches. Further, there may not be any techniques for assuring that such changes made are consistent across different data sources that may include different information, processes, or characteristics.

The subject matter described herein provides techniques for maintaining consistency across the different data sources while performing distributed operations or mutations. For example, annotated data schemas for respective data sources may describe operations and information for performing a distributed operation and for performing a rollback operation in the case of any errors that may occur as a result of a distribute operation. In this way, even in light of different characteristics, supported operations, or other aspects of different data sources, consistency of data may be maintained.

One such technique may include a metadata mechanism for upstream data sources to declare support for distributed transactional mutations or operations that may be automatically processed by a federation management service. Such a mechanism may be extensible to multiple protocols for distributed transactions with different trade-offs and transactional guarantees. However, the subject matter described herein does not impose any specific technology or middleware for the clients to participate in the transaction. Instead, such clients may declare which endpoints support the interface of the transactional protocol. Further, client-side applications can transparently access the transactional field using the standard schema and protocol of the federated API.

For example, a user of the cloud platform 115 may provide user input to the federation management service to create a federated API that includes one or more data sources. The user may provide user input (e.g., through a client 105) to perform a distributed operation that may include one or more mutations performed on the data sources. For example, the user may operate a business and may perform a mutation to record the purchase of an item across a "purchases" data source and an "invoice" data source. However, an error in the mutation process associated with the order may occur. As a result, the cloud platform 115 may use the information that is annotated in the data schemas of the "purchases" data source and the "invoice" data source to configure one or more rollback operations to effectively rollback or compensate for the errors. Further, the cloud platform 115 may access endpoints at each of the data sources for performing one or more aspects of the rollback operation at each of the data sources. The cloud platform 115 may call one or more operations at each of the data sources to actually perform the various operations at the different data sources, thereby maintaining consistency across the data sources in accordance with the different characteristics or information present at the different data sources.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
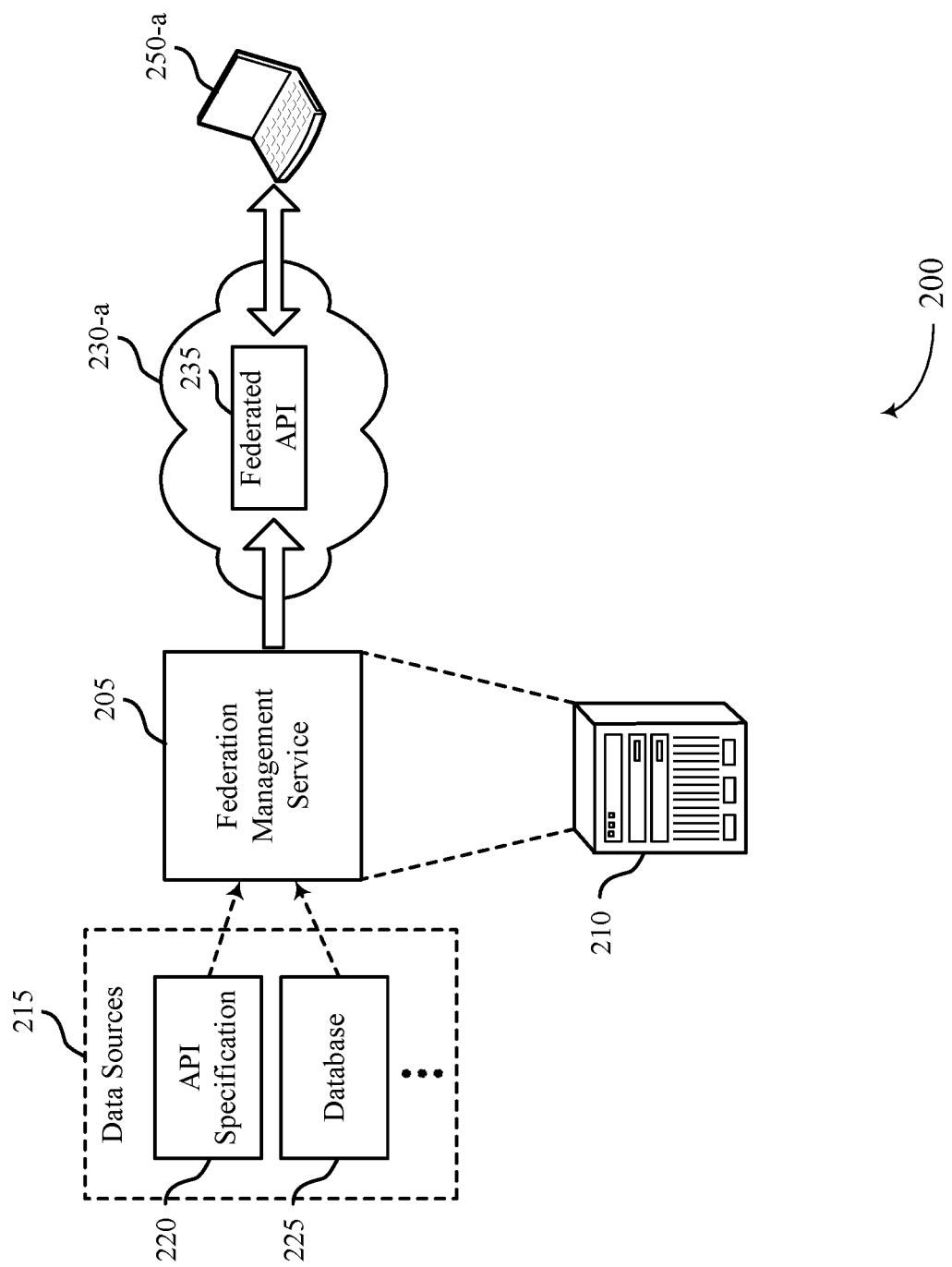
FIG. 2 illustrates an example of a computing environment that supports federated distributed mutation in accordance with examples as disclosed herein.

FIG. 2 illustrates an example of a computing environment 200 that supports federated distributed mutation in accordance with examples as disclosed herein.

The computing environment 200 includes a server 210, hosts 230, and client devices 250. The server 210 may be an example of aspects of cloud platform 115 of FIG. 1 and/or subsystem 125 of FIG. 1. The server 210 may represent various physical and/or logical computing systems that support a federation management service 205 that may be used by clients or tenants (e.g., cloud client 105 of FIG. 1) in support of applications that are accessible via computing devices, such as client devices 250.

Some applications (e.g., client applications executing on client devices 250, web services, etc.) may retrieve data from multiple data sources, such as data sources 215. For example, an application (or service supported by an application) may provide a status of an online purchase order, and the application may retrieve data related to shipping information from a first data source, data related to order status information from a second data source, and data related to the item being purchased from a third data source. The application may interface with these data sources using respective APIs. The data sources may include RESTful APIs, Async APIs, gRPC APIs, databases, or the like. Conventional techniques for retrieving data or accessing services may require configuration of multiple APIs at the application and configuration of the application to process the data received from the multiple APIs (e.g., by merging or linking fields via hardcoded relationships).

The federation management service 205 described herein may support the creation of an aggregated or federated API 235 based on multiple data sources 215. In such examples, a user (e.g., an API architect or administrator) may declaratively link elements from multiple APIs using a user interface. The federation management service 205 may generate a new API having a unified schema that incorporates the linked elements across the multiple data sources 215. In some examples, the federated API may be referred to as a datagraph.

The federation management service 205 may support a user interface (UI) that allows a user to select multiple data sources 215 that are to be included in the federated API 235. The user may also select various deployment configurations, such as a host environment (e.g., a host 230-a, which may be an example of cloud environment), endpoint details, authentication details, and the like. After selection of configuration parameters, the federation management service 205 may ingest or process the data sources 215, such as APIs and databases based on API specification 220 and/or a schema of a database 225, to generate the federated API 235. The federated API 235 may be deployed at the host environment (e.g., host 230-a) based on the user selected parameters. In some examples, the federated API 235 is deployed in a cloud environment (e.g., host 230-a). Additionally, or alternatively, the federated API 235 may be deployed at a local host (e.g., at a host associated with or supported the server 210) or a host associated with the tenant or cloud client.

An application or client (e.g., an application or client executing on client devices 250) may be configured to access an endpoint of the federated API 235 to access data and/or services supported by the underlying data sources 215. As such, rather than accessing the data/services from multiple data source endpoints for each for the data sources 215, the application is configured to access the data/services using the endpoint(s) for the federated API 235, which may support improved computing efficiency (e.g., at the application and the hosts) and reduced complexity.

In some implementations, the federation management service 205 may manage the operation of the federated API 235. The federation management service 205 may create the federated API 235 and may include annotations in respective data schemas of the data sources associated with the federated API 235 that may provide an endpoint for performing one or more aspects of a rollback operation at the data sources, along with information (e.g., transaction identifiers, endpoint locations, data source identifiers, other information, or any combination thereof) used to coordinate the rollback operation across the data sources. The federation management service 205 may monitor the host 230-a, the federated API 235, or both, for errors that may occur as a result of performing a mutation associated with the data sources of the federated API 235. If an error is detected, the federation management service 205 may invoke the rollback operation to "undo" or otherwise rectify the error in accordance with the information of the annotated data schemas, thereby maintaining consistency of data or other elements across the data sources.

Figure 3:
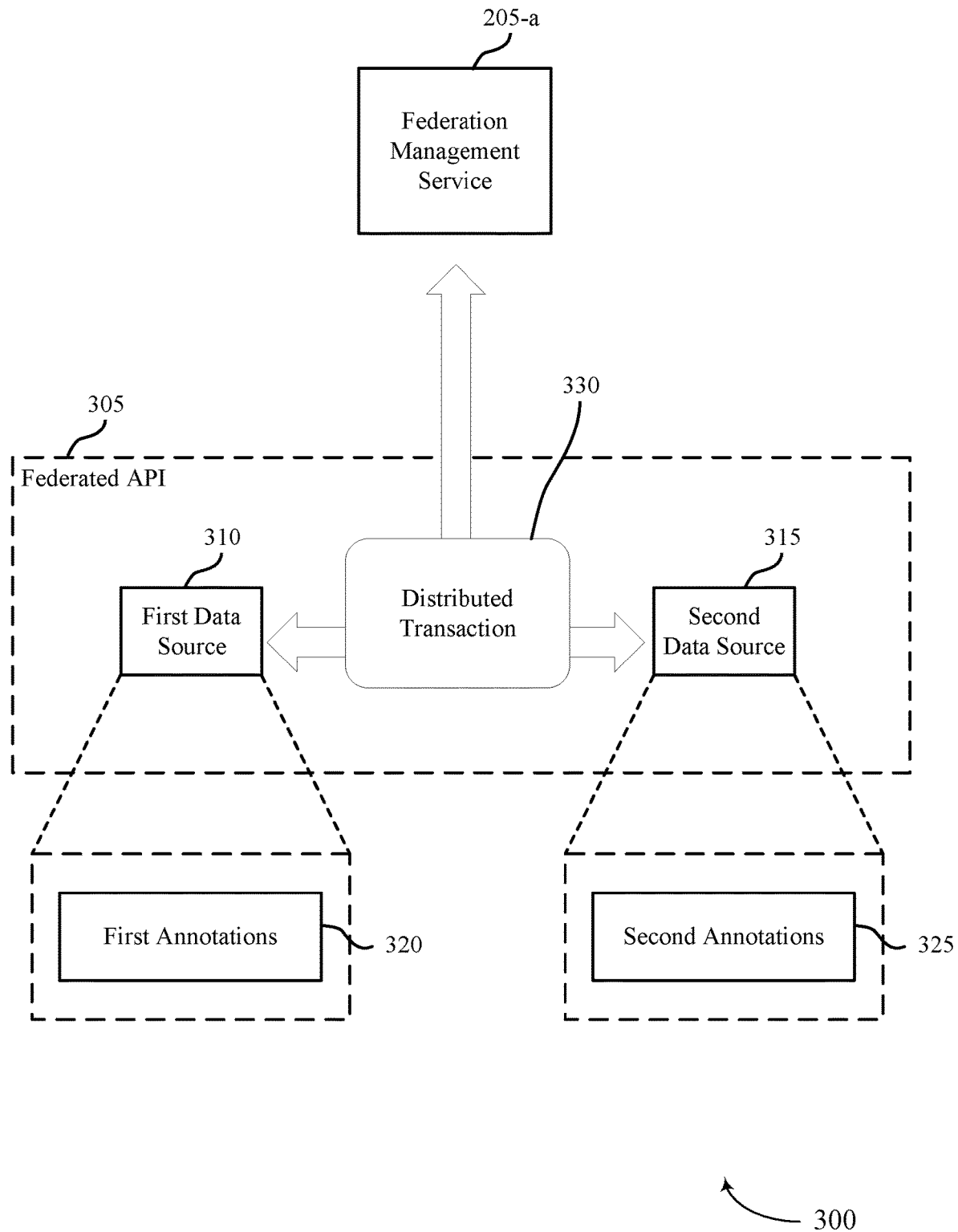
FIG. 3 illustrates an example of a computing environment that supports federated distributed mutation in accordance with examples as disclosed herein.

FIG. 3 illustrates an example of a computing environment 300 that supports federated distributed mutation in accordance with examples as disclosed herein. The computing environment may include or involve a federation management service 205-a, a federated API 305, a first data source 310, a second data source 315, first annotations 320, second annotations 325, and a distributed transaction 330. Though the first data source 310 and the second data source 315 are depicted and discussed, the techniques described herein may be employed with any number of data sources.

The subject matter described herein may include techniques for performing distributed mutations (e.g., writes, additions, deletions, modifications, or any combination thereof) over multiple data sources (e.g., APIs in a federated API) while providing some transactional guarantees or safeguards about how those write operations are performed in the upstream data sources (e.g., the first data source 310 and the second data source 315). In this way, the subject matter described herein allows for exposure of multiple related write operations in the federated API 305 schema as a single operation in the same way that can be achieved for safe read operation.

For example, the federation management service 205-a may generate the federated API 305 from the first data source 310 and the second data source 315. The first data source 310 and the second data source 315 may each include annotations (e.g., the first annotations 320 or the second annotations 325) to their respective data schemas. These annotations may define one or more elements for performing distributed transactions, one or more rollback operations, or both. For example, the first annotations 320 may define an endpoint for performing the distributed transaction 330 on both the first data source 310 and the second data source 315. The distributed transaction 330 may be a mutation of the first data source 310 and the second data source 315. As described herein, a mutation may include one or more operations or procedures, including writing data, adding data, removing data, modifying data, one or more other operations or procedures, or any combination thereof. In some examples, the distributed transaction 330 may be performed according to a transaction protocol. For example, such a protocol may be a 2PC protocol, a SAGAS protocol, another distributed transaction protocol, or any combination thereof.

In some examples, the federation management service 205-a may receive a request to perform the distributed transaction 330 (e.g., mutation or other operation) on the first data source 310 and the second data source 315. In some examples, the federation management service 205-a may receive the request directly. In other examples, the request may be received at the federated API 305. In some examples, the request may be received via a single call to a single field of the federated API 305.

In some examples, the federation management service 205-a may organize, generate, select, orchestrate, or otherwise coordinate one or more calls (e.g., mutation calls) to the first data source 310 and the second data source 315 according to the distributed transaction protocol (e.g., 2PC, SAGAS, or other protocol).

In some examples, the first data source 310 and the second data source 315 may expose (e.g., on a declarative) a set of capabilities for participating in a distributed transaction protocol where the federation gateway acts as coordinator node. Such sets of capabilities may be included in or referred to as the first annotations 320 and the second annotations 325 that are associated with the first data source 310 and the second data source 315 respectively.

In some examples, the actual capability exposed depends on the type of distributed transaction protocol that is going to be used. For example, if a 2PC protocol is used, upstream services (e.g., the first data source 310 and the second data source 315) may provide endpoints compliant with the prepare and commit stages for the operation that is going to be federated and mark them using metadata annotations in the service schema. Additionally, or alternatively, if a sagas or compensating transactions mechanism is used, services might expose endpoints to mutate and compensate the mutations in the service schema and annotate them accordingly. Other distributed transaction protocols may be used, and the techniques described herein may be adapted accordingly to utilize the other distributed transaction protocols.

In some examples, the federation management service 205-a may detect the first annotations 320 and the second annotations 325 in the first data source 310 and the second data source 315. Based on the first annotations 320 and the second annotations 325, the federation management service 205-a may determine or generate a single write operation for the federated schema for the federated API 305.

The following depicts a first example API associated with invoices, referred to as the Invoices API:

```
openapi: 3.0.3
info:
  title: Invoices API
  description: Creates a new invoice
  version: 1.0.0
servers:
  - url: 'https://services.mythical.com/invoices/'
components:
  schemas:
    Invoice:
        type: object
        properties:
        # list of invoice properties here
    InvoiceCreationResponse:
        type: object
        properties:
        id:
      type: string
          transactionId:
      type: string
paths:
  /invoices:
  post:
  x-rename: purchase
        x-transactionable:
          protocol: sagas
          txid: "$response.payload.transactionId"
          rollback: "/invoices/rollback/{txid}"
      payload-alias: invoice
          description: creates a new invoice that can be rolledback
          requestBody:
            content:
              "application/json":
                schema:
                  $ref: "#/components/schemas/Invoice"
                responses:
                  "201":
    description: The invoice has been created
    content:
          application/vnd.api+json:
      schema:
        $ref: "#/components/schemas/InvoiceCreationResponse"
  /invoices/rollback/{txId}:
        put:
        parameters:
          - name: id
      in: path
      required: true
            description: the identifier of the invoices transaction to rollback
      schema:
      type: string
      description: rollbacks invoice creation transactions
      responses:
        "200":
    description: The transaction has been rolled back
        "500":
    description: Internal server error rolling back the transaction
          "404":
    description: The provided transaction ID cannot be found
```

Example API 1: Invoices API

The Invoices API depicted herein may be an example of the first data source 310 or the second data source 315 and may provide examples of various aspects of the subject matter described herein, such as the first annotations 320 or the second annotations 325.

For example, the Invoices API depicted herein exposes a mutable operation with a POST operation (/invoices) that may allow a client to create an invoice. The Invoices API may be annotated with a "x-transactionable" metadata annotation. This annotation may include or declare one or more aspects of the Invoices API that may be used for performing a distributed transaction (e.g., a mutation, an error correction such as a rollback operation or a compensation operation).

For example, the annotation may include an indication of a supported transaction protocol (e.g., SAGAS). The annotation may include a payload-alias field that may introduce or designate a field name that may be used to pass the invoice information as an input for the generated federated field (e.g., the single field that may be used to perform a mutation or a rollback operation). In cases where multiple payloads are used, each of them may be introduced or designated using the alias provided in the annotation.

The annotation may include a location of a transaction ID for a new invocation to the POST operation using a path declaration (e.g., $response.payload.transactionId"). The annotation may include a location for an endpoint for the rollback or compensation of the transaction and how to invoke it (e.g., "/invoices/rollback/{txid}"). In some examples, the rollback endpoint may support a protocol (e.g., a sagas protocol) in which a transaction ID is accepted and a predefined status code signal that indicates that a transaction has been rolled back or a failure has happened (or other information associated with the protocol).

In some examples, an implementation of the Invoices API may manage compliance with the protocol, annotations, or other approaches used. For example, an implementation of the Invoices API may provide for functionality to generate unique transaction IDs, accept a rollback or compensation request, and generate the rollback or compensating transaction in the service state for the provided transaction ID.

The following depicts a second example API associated with purchases, referred to as the Purchases API:

```
openapi: 3.0.3
info:
   title: Purchases API
   description: Creates a new purchase
   version: 1.0.0
servers:
   - url: 'https://services.mythical.com/purchases/'
components:
   schemas:
      Purchase:
         type: object
         properties:
         # list of invoice properties here
paths:
   /purchases:
   post:
   x-rename: purchase
         X-transactionable:
            protocol: sagas
            txid: "$response.headers.x-txid"
            rollback: "/purchases/rollback/{txid}"
      payload-alias: purchase
         description: creates a new purchase that can be rolledback
         requestBody:
         content:
```

-continued

```
"application/json":
   schema:
      $ref: "#/components/schemas/Purchase"
   responses:
      "201":
   description: The purchase has been created
      headers:
      x-txid:
         description: transaction ID
         schema:
         type: string
/purchases/rollback/{txId}:
   put:
      parameters:
         - name: id
            in: path
            required: true
            description: the identifier of the purchase transaction to rollback
         schema:
            type: string
         description: rollbacks purchase creation transactions
      responses:
         "200":
         description: The transaction has been rolled back
         "500":
         description: Internal server error rolling back the transaction
         "404":
         description: The provided transaction ID cannot be found
```

Example API 2: Purchases API

The Invoices API depicted herein may be an example of the first data source 310 or the second data source 315 and may provide examples of various aspects of the subject matter described herein, such as the first annotations 320 or the second annotations 325.

In some examples, it may not be necessary for the various data sources to exactly match the same patterns of annotations or information. For example, the annotations or declarative metadata that indicates support for the subject matter described herein may allow for flexibility in particular methods or techniques for exposing the information in the annotations. For example, in the case of the example Purchases API, the transaction ID is returned in a header in the response (e.g., $response.headers.x-txid) instead of the payload.

In some examples, the first annotations 320 and the second annotations 325 may include an annotation that may be associated with a field for the respective endpoints. For example, both the Invoices API and the Purchases API include the "x-rename" annotation that may instruct the federation logic to generate the same field for both endpoints (e.g., in this case using the 'purchase' name for the federated field).

In some examples, the information described herein may be sufficient to allow the federation management service 205-a to expose both endpoints as a single field in the federated API 305 and orchestrate the invocation to both upstream data sources (the first data source 310 and the second data source 315) within a single distributed transaction 330 (e.g., SAGAS or 2PC).

For example, the federation management service 205-a may generate the schema for the federated API 305 and may identify that both endpoints in both the first data source 310 and the second data source 315 (e.g., the Invoices API and the Purchases API described as examples herein) are to be mapped to the same mutation field (e.g., identified as 'purchase' through the x-rename annotation in the examples).

Since the example Invoices API and the Purchases API both have support for compatible 'sagas'-style transactions (as one example of a distributed transaction 330), the unified schema for the federated API 305 may be generated with the single field (optionally with associated metadata) that may be used to execute a transaction (e.g., at runtime) that may invoke the upstream Invoices and Purchases endpoints.

In some examples, a portion of a data schema for the federated API 305 may be referred to as the Federated Schema, and may be as follows:

```
@transaction("sagas")
mutation purchase(invoice: Invoice, purchase: Purchase) {
    invoice: InvoiceCreationResponse
}
```

Example Federated API Schema

In this example, the Federated API Schema may include a single field for performing a distributed transaction 330 or mutation. For example, one purchase field has been created. The purchase field accepts input data for each upstream data source using the provided alias. The Federated API Schema may return data from each upstream data source with the provided alias (if anything is returned). The Federated API Schema may be annotated with a directive marking the field as transactional according to a supported protocol (e.g., SAGAS).

In some examples, support for federation may function even if only one API is added to the federated schema. In such a case, the shape of the mutation or transaction may be the same (e.g., with only one alias in the input and response) and, optionally, no "@transaction" directive is generated. In the same way, removing APIs or data sources may only minimally change the field contract by removing the alias fields in the input and response.

When the federated write operation is invoked, the federation management service 205-*a* may initiate the transaction protocol acting as a coordinator and invoking the upstream data sources' exposed capabilities used to satisfy the transaction protocol.

Figure 4:
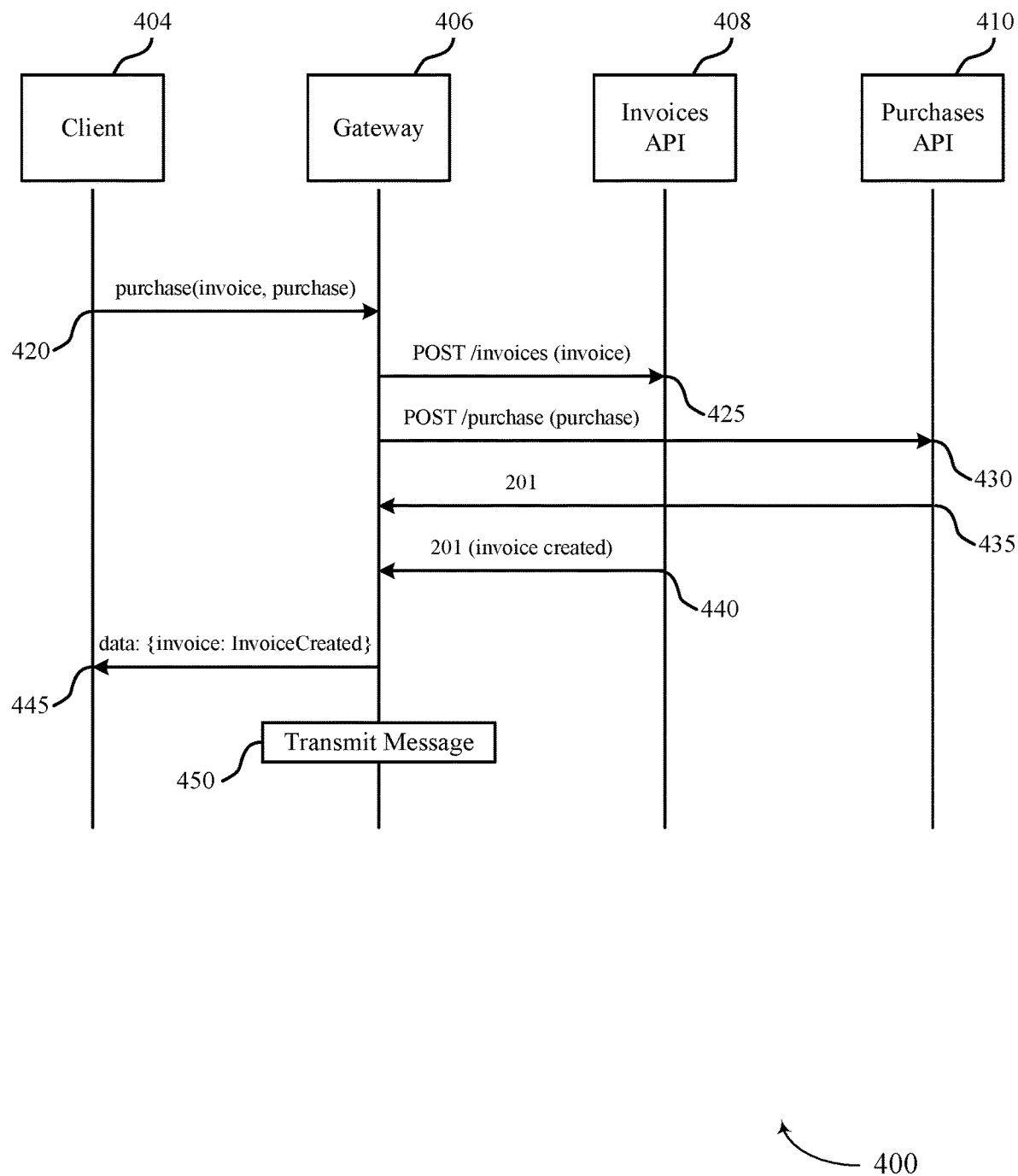
FIG. 4 illustrates an example of a process flow that supports federated distributed mutation in accordance with examples as disclosed herein.

FIG. 4 illustrates an example of a process flow 400 that supports federated distributed mutation in accordance with examples as disclosed herein. The process flow 400 may include a client 404, a gateway 406, an invoices API 408, and a purchases API 410.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

The process flow 400 may depict an example of a successful execution of a distributed transaction. Though the process flow 400 involves an example SAGAS protocol approach, the actual invocations and metadata in the contracts of the upstream APIs (e.g., the invoices API 408 and the purchases API 410) may correspond with the shared transaction protocol (e.g., a 2PC protocol may involve commit and rollback endpoints).

At 420, the client 404 may transmit a request to invoke the purchase transaction that includes indications of the invoices API 408 and the purchases API 410. At 425, the gateway 406 may invoke the invoices API 408 (e.g., via a POST operation designating the invoices API 408). At 430, the gateway 406 may invoke the purchases API 410 (e.g., via a POST operation designating the purchases API 410).

At 435, the purchases API 410 may respond to the gateway with a success response (e.g., a 201 response that may indicate successful execution at the purchases API 410). At 440, the invoices API 408 may respond to the gateway with a success response (e.g., a 201 response that may indicate successful execution at the invoices API 408). For example, an invoice may be created using the invoices API 408.

At 445, the gateway 406 may return a final response composing the relevant payloads from the individual services (in this case only from the invoices API 408).

Figure 5:
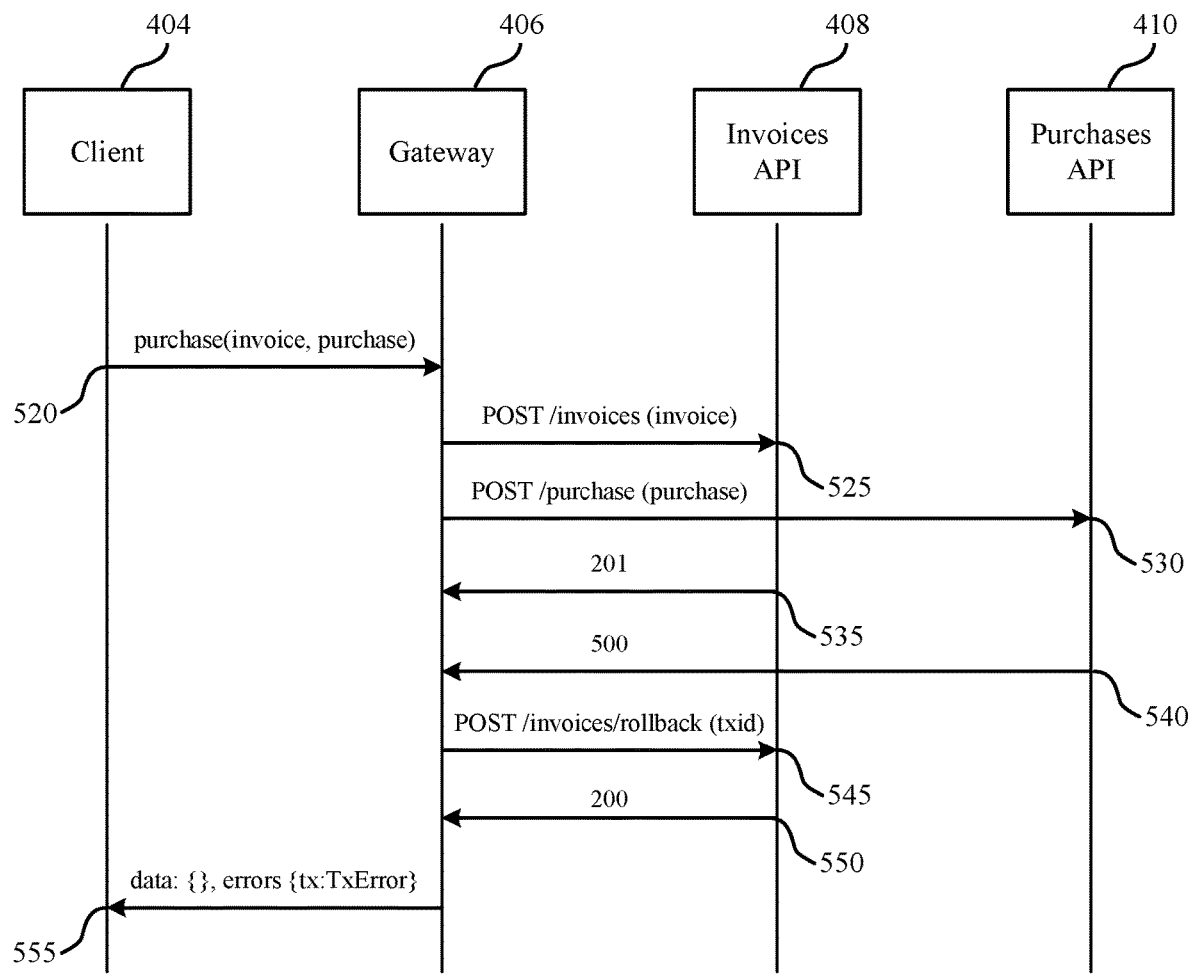
FIG. 5 illustrates an example of a process flow that supports federated distributed mutation in accordance with examples as disclosed herein.

FIG. 5 illustrates an example of a process flow 500 that supports federated distributed mutation in accordance with examples as disclosed herein. The process flow 500 may include a client 404, a gateway 406, an invoices API 408, and a purchases API 410.

In the following description of the process flow 500, the operations between the various entities or elements may be performed in different orders or at different times. Some operations may also be left out of the process flow 500, or other operations may be added. Although the various entities or elements are shown performing the operations of the process flow 500, some aspects of some operations may also be performed by other entities or elements of the process flow 500 or by entities or elements that are not depicted in the process flow, or any combination thereof.

The process flow 500 may depict an example of a failed execution of a distributed transaction. Though the process flow 500 involves an example SAGAS protocol approach, the actual invocations and metadata in the contracts of the upstream APIs (e.g., the invoices API 408 and the purchases API 410) may correspond with the shared transaction protocol (e.g., a 2PC protocol may involve commit and rollback endpoints).

At 520, the client 404 may transmit a request to invoke the purchase transaction that includes indications of the invoices API 408 and the purchases API 410. At 525, the gateway 406 may invoke the invoices API 408 (e.g., via a POST operation designating the invoices API 408). At 530, the gateway 406 may invoke the purchases API 410 (e.g., via a POST operation designating the purchases API 410).

At 535, the invoices API 408 may respond to the gateway 406 with a success response (e.g., a 201 response that may indicate successful execution at the invoices API 408). However, at 540, the purchases API 410 may respond to the gateway 406 with a failure response (e.g., a 500 response indicating an internal error at the purchases API 410).

At 545, the gateway 406, after discovering the failure, may act as a coordinator and trigger a rollback in the invoices API 408 that may generate a rollback or compensation transaction in the invoices API 408. At 550, the invoices API 408 may respond to the gateway 406 with a success response (e.g., a 200 response that may indicate that the rollback or compensation transaction or operation at the invoices API 408 was successful). At 555, the gateway may, after confirming that the compensating transaction has been created, return a response (e.g., an empty response) to the client including information about the transaction error (e.g., using a reporting protocol associated with the client).

Figure 6:
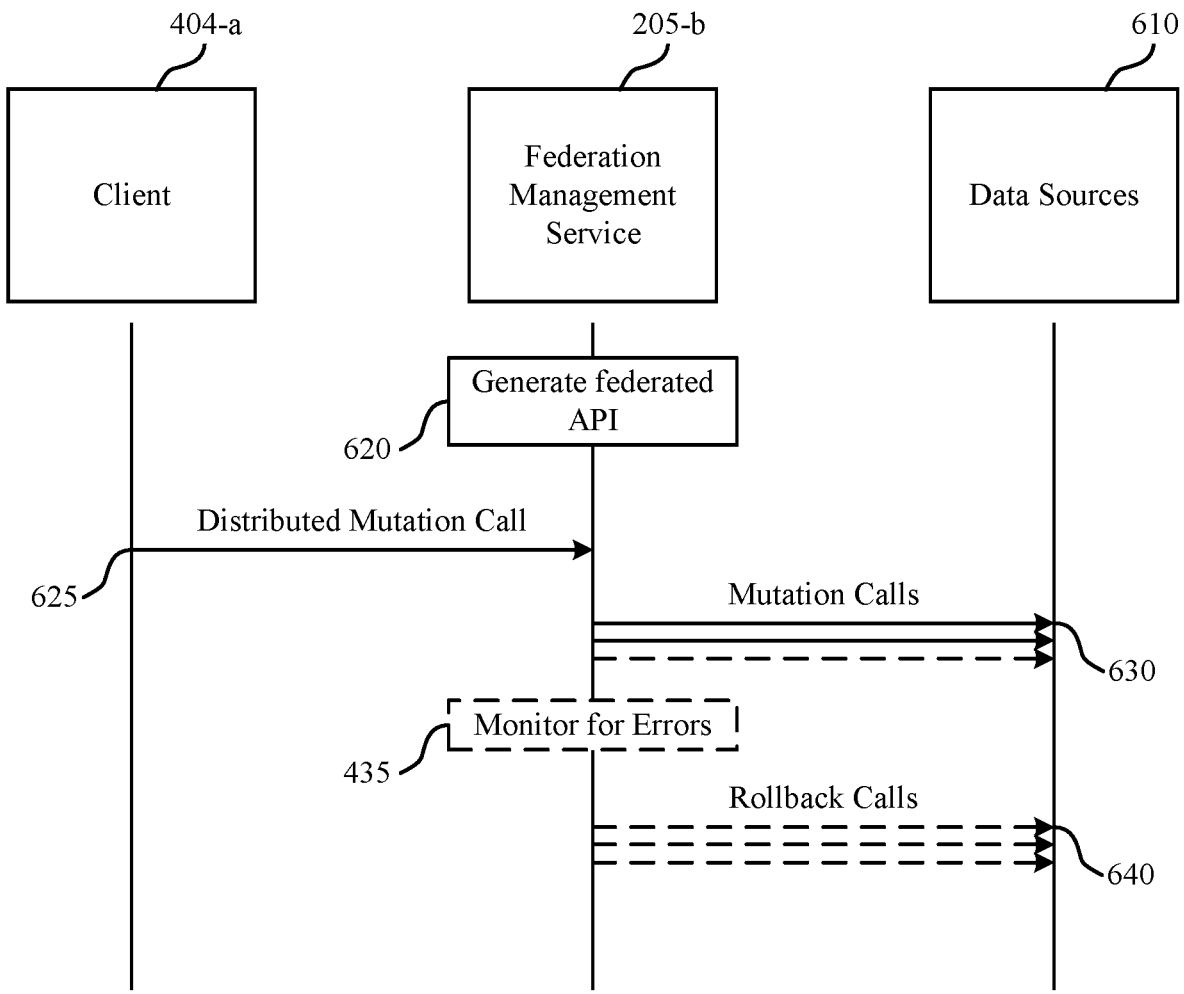
FIG. 6 illustrates an example of a process flow that supports federated distributed mutation in accordance with examples as disclosed herein.

FIG. 6 illustrates an example of a process flow 600 that supports federated distributed mutation in accordance with examples as disclosed herein. The process flow 600 may implement various aspects of the present disclosure described herein. The elements described in the process flow 600 (e.g., the client 404-a, the federation management service 205-b, and the data sources 610) may be examples of similarly-named elements described herein.

In the following description of the process flow 600, the operations between the various entities or elements may be performed in different orders or at different times. Some operations may also be left out of the process flow 600, or other operations may be added. Although the various entities or elements are shown performing the operations of the process flow 600, some aspects of some operations may also be performed by other entities or elements of the process flow 600 or by entities or elements that are not depicted in the process flow, or any combination thereof.

At 620, the federation management service 205-b may generate a federated application programming interface (API) from a plurality of data sources and one or more of the plurality of data sources may include an annotated data schema that defines one or more API endpoints for performing a distributed mutation of the plurality of data sources according to a supported distributed transaction protocol.

In some examples, the annotated data schema further defines one or more rollback operations for maintaining state consistency across the plurality of data sources. In some examples, the annotated data schema may include a path parameter that may indicate a location of a rollback endpoint and an associated input for invoking the one or more rollback operations. In some examples, the annotated data schema may include a payload alias that identifies a respective data source for receiving a payload as part of the distributed mutation. In some examples, the annotated data schema may include a path parameter that indicates a location of a transaction identifier.

In some examples, generating the federated API may include identifying that each of the plurality of data sources includes a common identifier that maps a respective data source to the single field and the single field may include the common identifier. In some examples, generating the federated API may include identifying that the plurality of data sources each support the supported distributed transaction protocol based on the annotated data schema indicating support for the distributed transaction protocol.

At 625, the federation management service 205-b may receive, via a single call to a single field of the federated API, a request at the federated API to perform a distributed mutation on the plurality of data sources.

At 630, the federation management service 205-b may orchestrate, via a federation management service and the one or more API endpoints, a plurality of mutation calls to the plurality of data sources according to the distributed transaction protocol.

At 635, the federation management service 205-b may monitor for an error corresponding to one or more of the plurality of mutation calls.

At 640, the federation management service 205-b may issue, based on the orchestrating, one or more rollback calls invoking the one or more rollback operations.

Figure 7:
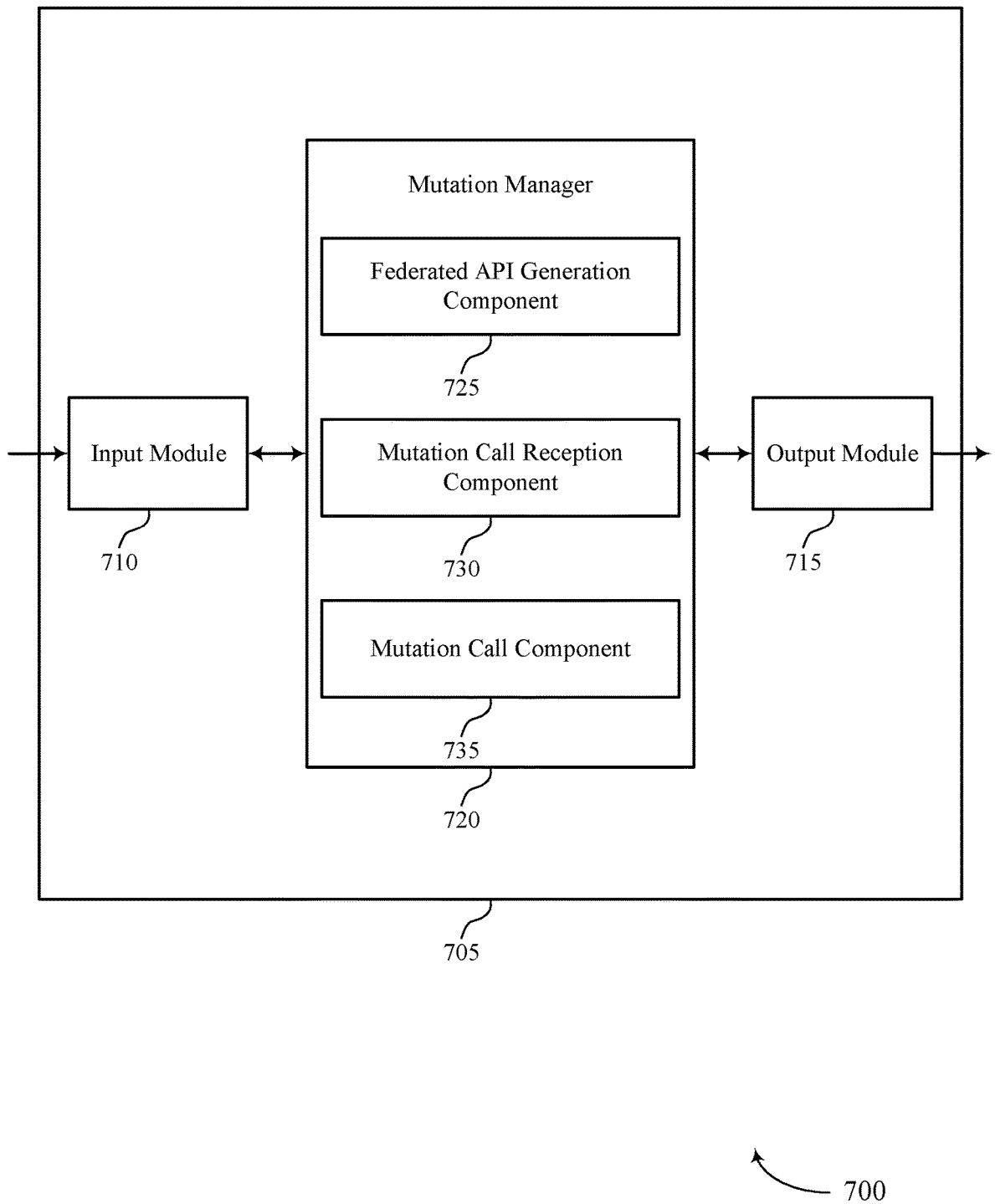
FIG. 7 shows a block diagram of an apparatus that supports federated distributed mutation in accordance with examples as disclosed herein.

FIG. 7 shows a block diagram 700 of a device 705 that supports federated distributed mutation in accordance with examples as disclosed herein. The device 705 may include an input module 710, an output module 715, and a mutation manager 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the mutation manager 720 to support federated distributed mutation. In some cases, the input module 710 may be a component of an I/O controller 910 as described with reference to FIG. 9.

The output module 715 may manage output signals for the device 705. For example, the output module 715 may receive signals from other components of the device 705, such as the mutation manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an I/O controller 910 as described with reference to FIG. 9.

For example, the mutation manager 720 may include a federated API generation component 725, a mutation call reception component 730, a mutation call component 735, or any combination thereof. In some examples, the mutation manager 720, or various components thereof, may be configured to perform various operations (e.g., receiving, monitoring, transmitting) using or otherwise in cooperation with the input module 710, the output module 715, or both. For example, the mutation manager 720 may receive information from the input module 710, send information to the output module 715, or be integrated in combination with the input module 710, the output module 715, or both to receive information, transmit information, or perform various other operations as described herein.

The mutation manager 720 may support data processing in accordance with examples as disclosed herein. The federated API generation component 725 may be configured as or otherwise support a means for generating a federated application programming interface (API) from a set of multiple data sources, where one or more of the set of multiple data sources includes an annotated data schema that defines one or more API endpoints for performing a distributed mutation of the set of multiple data sources according to a supported distributed transaction protocol. The mutation call reception component 730 may be configured as or otherwise support a means for receiving, via a single call to a single field of the federated API, a request at the federated API to perform a distributed mutation on the set of multiple data sources. The mutation call component 735 may be configured as or otherwise support a means for orchestrating, via a federation management service and the one or more API endpoints, a set of multiple mutation calls to the plurality of data sources according to the distributed transaction protocol.

Figure 8:
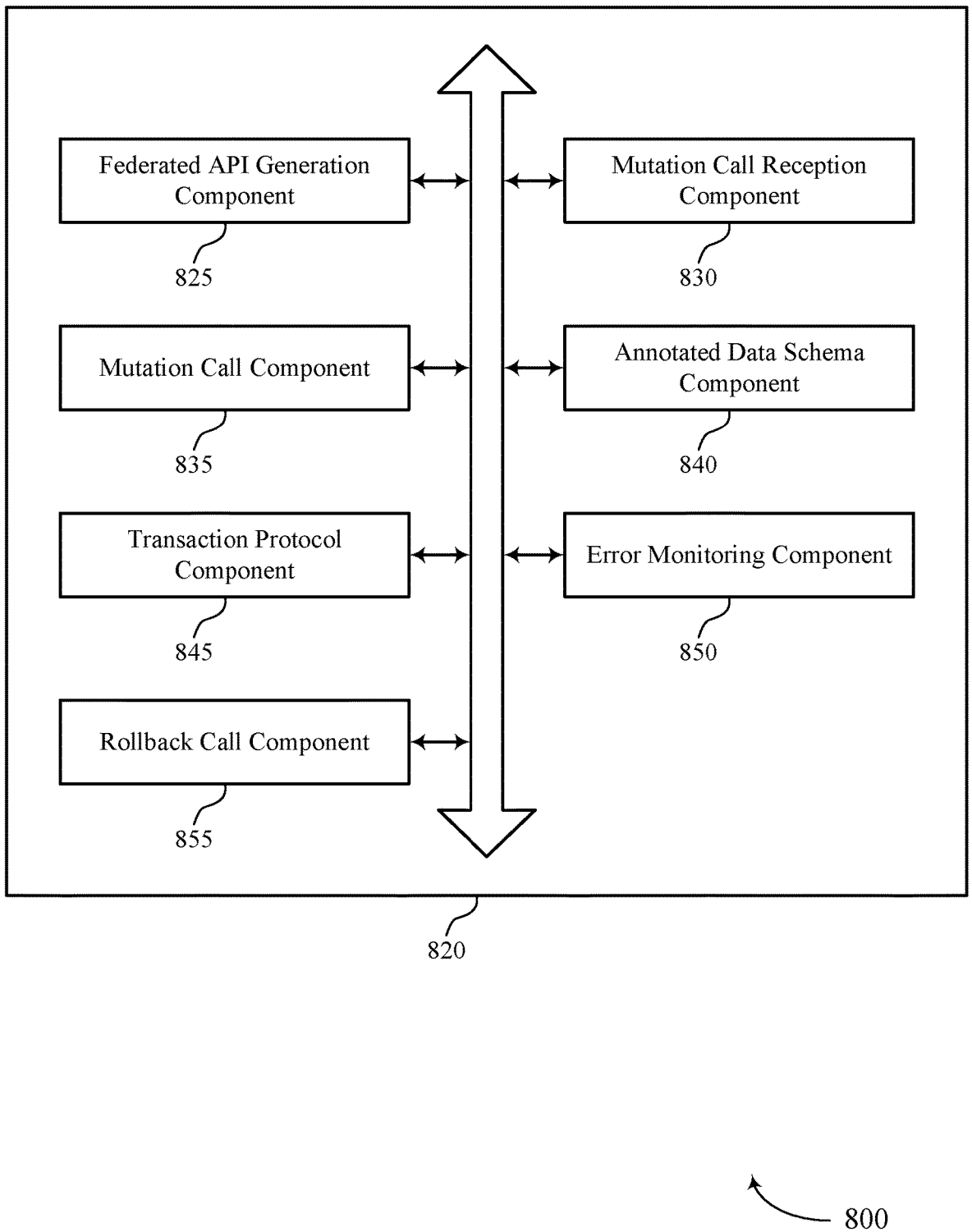
FIG. 8 shows a block diagram of a mutation manager that supports federated distributed mutation in accordance with examples as disclosed herein.

FIG. 8 shows a block diagram 800 of a mutation manager 820 that supports federated distributed mutation in accordance with examples as disclosed herein. The mutation manager 820 may be an example of aspects of a mutation manager or a mutation manager 720, or both, as described herein. The mutation manager 820, or various components thereof, may be an example of means for performing various aspects of federated distributed mutation as described herein. For example, the mutation manager 820 may include a federated API generation component 825, a mutation call reception component 830, a mutation call component 835, an annotated data schema component 840, a transaction protocol component 845, an error monitoring component 850, a rollback call component 855, or any combination thereof. Each of these components may communicate, directly or indirectly, with one another (e.g., via one or more buses).

The mutation manager 820 may support data processing in accordance with examples as disclosed herein. The federated API generation component 825 may be configured as or otherwise support a means for generating a federated application programming interface (API) from a set of multiple data sources, where one or more of the set of multiple data sources includes an annotated data schema that defines one or more API endpoints for performing a distributed mutation of the set of multiple data sources according to a supported distributed transaction protocol. The mutation call reception component 830 may be configured as or otherwise support a means for receiving, via a single call to a single field of the federated API, a request at the federated API to perform a distributed mutation on the set of multiple data sources. The mutation call component 835 may be configured as or otherwise support a means for orchestrating, via a federation management service and the one or more API endpoints, a set of multiple mutation calls to the plurality of data sources according to the distributed transaction protocol.

In some examples, the annotated data schema further defines one or more rollback operations for maintaining state consistency across the set of multiple data sources.

In some examples, the error monitoring component 850 may be configured as or otherwise support a means for monitoring for an error corresponding to one or more of the set of multiple mutation calls. In some examples, the rollback call component 855 may be configured as or otherwise support a means for issuing, based on the orchestrating, one or more rollback calls invoking the one or more rollback operations.

In some examples, the annotated data schema includes a path parameter that indicates a location of a rollback endpoint and an associated input for invoking the one or more rollback operations.

In some examples, the annotated data schema component 840 may be configured as or otherwise support a means for generating the federated API includes identifying that each of the set of multiple data sources includes a common identifier that maps a respective data source to the single field, where the single field includes the common identifier.

In some examples, the annotated data schema includes a payload alias that identifies a respective data source for receiving a payload as part of the distributed mutation.

In some examples, the annotated data schema includes a path parameter that indicates a location of a transaction identifier.

In some examples, generating the federated API includes identifying that the set of multiple data sources each support the supported distributed transaction protocol based on the annotated data schema indicating support for the distributed transaction protocol.

Figure 9:
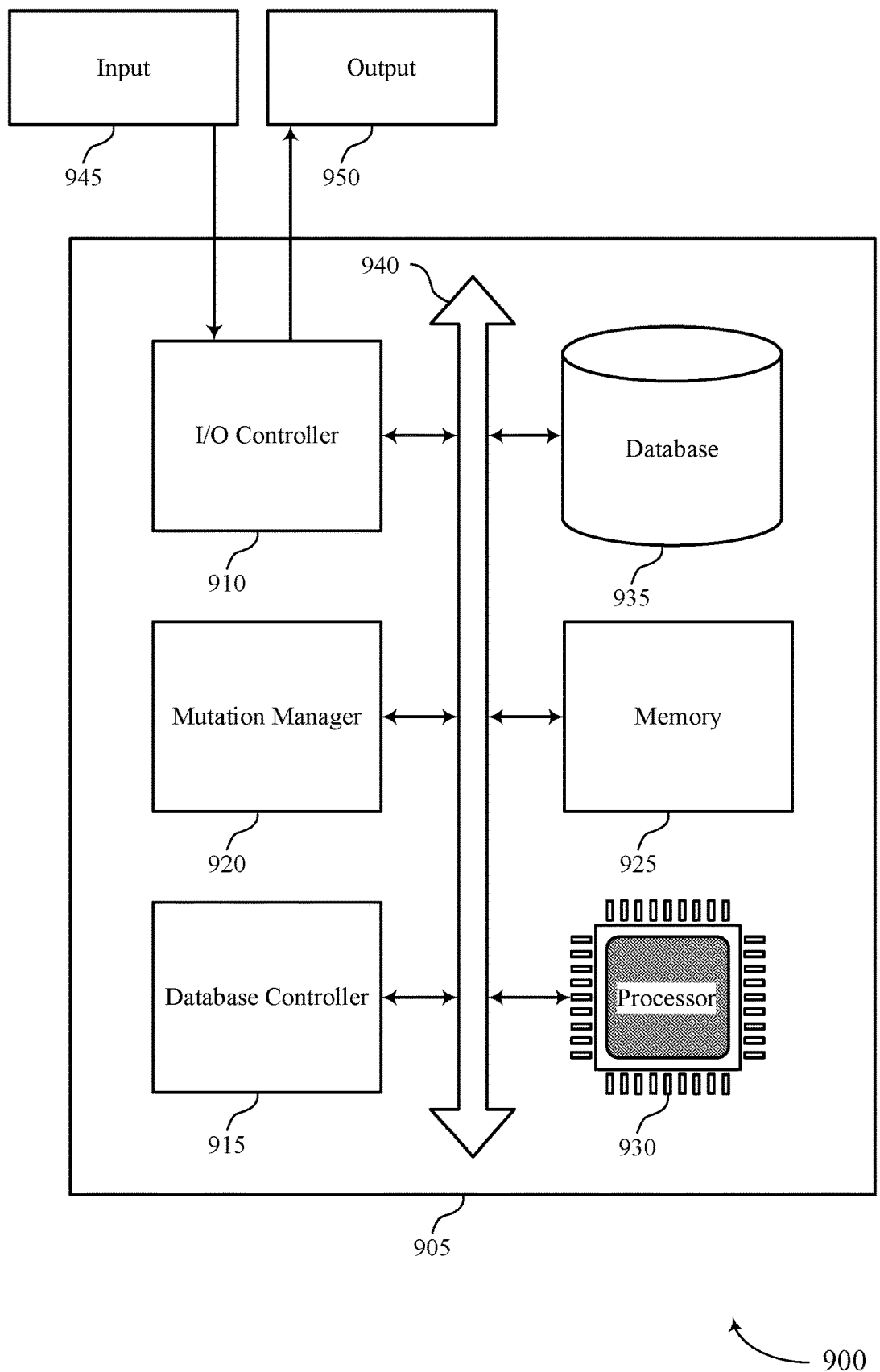
FIG. 9 shows a diagram of a system including a device that supports federated distributed mutation in accordance with examples as disclosed herein.

FIG. 9 shows a diagram of a system 900 including a device 905 that supports federated distributed mutation in accordance with examples as disclosed herein. The device 905 may be an example of or include the components of a device 705 as described herein. The device 905 may include components for bi-directional data communications including components for transmitting and receiving communications, such as a mutation manager 920, an I/O controller 910, a database controller 915, a memory 925, a processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and ROM. The memory 925 may store computer-readable, computer-executable software including instructions that, when executed, cause the processor 930 to perform various functions described herein. In some cases, the memory 925 may contain, among other things, a BIOS which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting federated distributed mutation).

The mutation manager 920 may support data processing in accordance with examples as disclosed herein. For example, the mutation manager 920 may be configured as or otherwise support a means for generating a federated application programming interface (API) from a set of multiple data sources, where one or more of the set of multiple data sources includes an annotated data schema that defines one or more API endpoints for performing a distributed mutation of the set of multiple data sources according to a supported distributed transaction protocol. The mutation manager 920 may be configured as or otherwise support a means for receiving, via a single call to a single field of the federated API, a request at the federated API to perform a distributed mutation on the set of multiple data sources. The mutation manager 920 may be configured as or otherwise support a means for orchestrating, via a federation management service and the one or more API endpoints, a set of multiple mutation calling to the plurality of data sources according to the distributed transaction protocol.

By including or configuring the mutation manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 10:
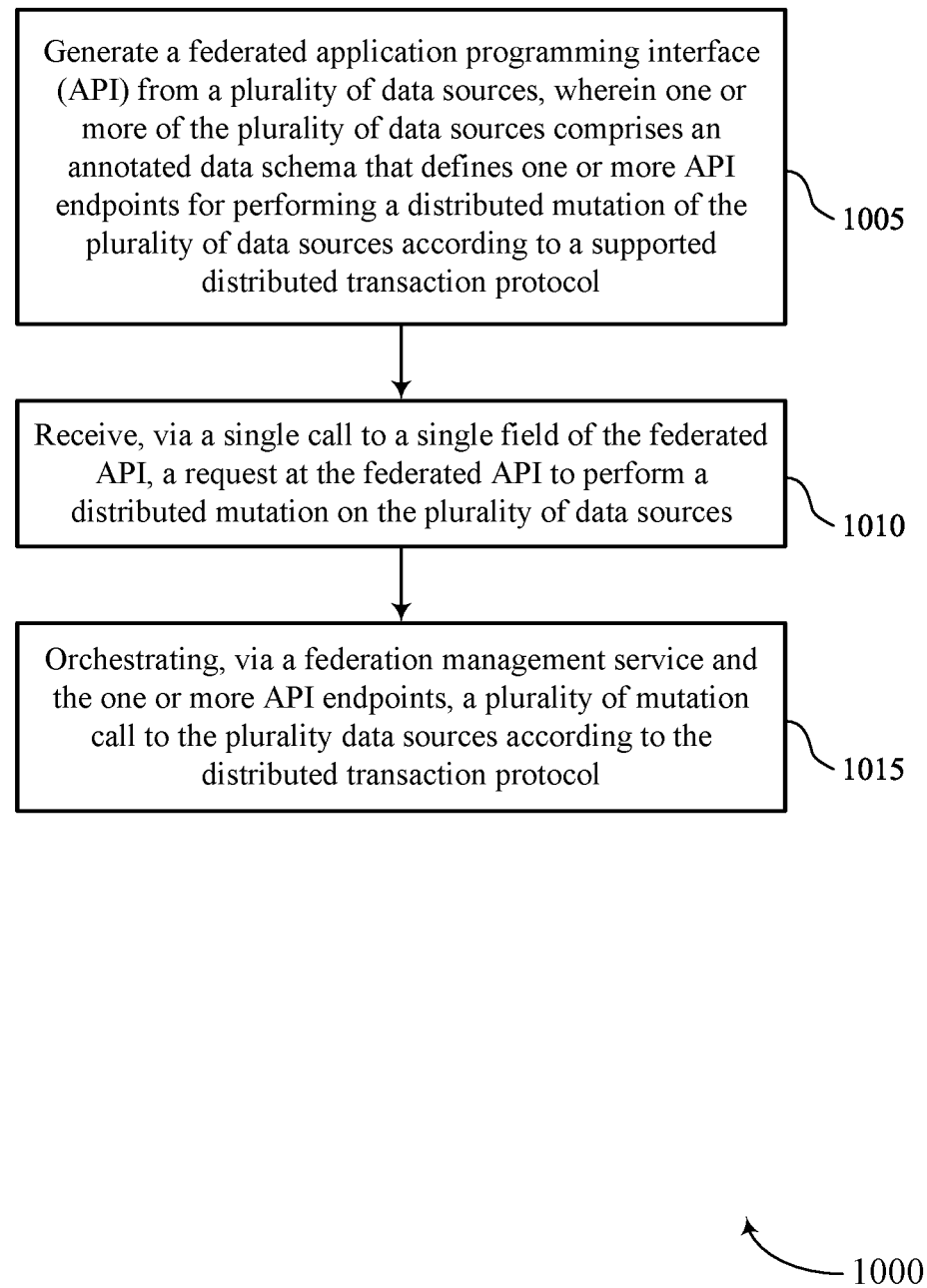
FIGS. 10 through 12 show flowcharts illustrating methods that support federated distributed mutation in accordance with examples as disclosed herein.

FIG. 10 shows a flowchart illustrating a method 1000 that supports federated distributed mutation in accordance with examples as disclosed herein. The operations of the method 1000 may be implemented by an application server or its components as described herein. For example, the operations of the method 1000 may be performed by an application server as described with reference to FIGS. 1 through 9. In some examples, an application server may execute a set of instructions to control the functional elements of the application server to perform the described functions. Additionally, or alternatively, the application server may perform aspects of the described functions using special-purpose hardware.

At 1005, the method may include generating a federated application programming interface (API) from a set of multiple data sources, where one or more of the set of multiple data sources includes an annotated data schema that defines one or more API endpoints for performing a distributed mutation of the set of multiple data sources according to a supported distributed transaction protocol. The operations of 1005 may be performed in accordance with examples as disclosed herein. In some examples, aspects of the operations of 1005 may be performed by a federated API generation component 825 as described with reference to FIG. 8.

At 1010, the method may include receiving, via a single call to a single field of the federated API, a request at the federated API to perform a distributed mutation on the set of multiple data sources. The operations of 1010 may be performed in accordance with examples as disclosed herein. In some examples, aspects of the operations of 1010 may be performed by a mutation call reception component 830 as described with reference to FIG. 8.

At 1015, the method may include orchestrating, via a federation management service and the one or more API endpoints, a set of multiple mutation calls to the plurality of data sources according to the distributed transaction protocol. The operations of 1015 may be performed in accordance with examples as disclosed herein. In some examples, aspects of the operations of 1015 may be performed by a mutation call component 835 as described with reference to FIG. 8.

Figure 11:
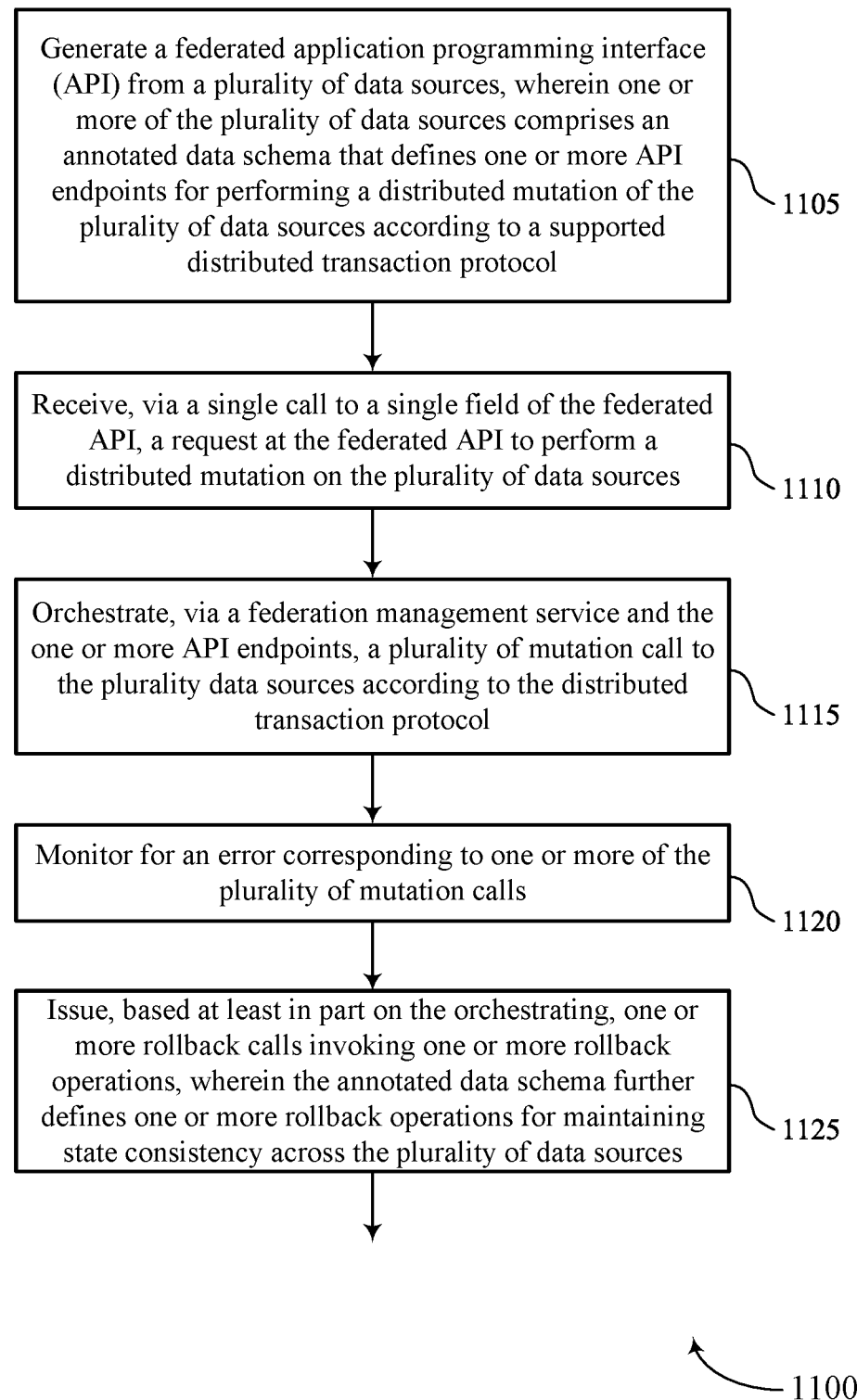

FIG. 11 shows a flowchart illustrating a method 1100 that supports federated distributed mutation in accordance with examples as disclosed herein. The operations of the method 1100 may be implemented by an application server or its components as described herein. For example, the operations of the method 1100 may be performed by an application server as described with reference to FIGS. 1 through 9. In some examples, an application server may execute a set of instructions to control the functional elements of the application server to perform the described functions. Additionally, or alternatively, the application server may perform aspects of the described functions using special-purpose hardware.

At 1105, the method may include generating a federated application programming interface (API) from a set of multiple data sources, where one or more of the set of multiple data sources includes an annotated data schema that defines one or more API endpoints for performing a distributed mutation of the set of multiple data sources according to a supported distributed transaction protocol. The operations of 1105 may be performed in accordance with examples as disclosed herein. In some examples, aspects of the operations of 1105 may be performed by a federated API generation component 825 as described with reference to FIG. 8.

At 1110, the method may include receiving, via a single call to a single field of the federated API, a request at the federated API to perform a distributed mutation on the set of multiple data sources. The operations of 1110 may be performed in accordance with examples as disclosed herein. In some examples, aspects of the operations of 1110 may be performed by a mutation call reception component 830 as described with reference to FIG. 8.

At 1115, the method may include orchestrating, via a federation management service and the one or more API endpoints, a set of multiple mutation calls to the plurality of data sources according to the distributed transaction protocol. The operations of 1115 may be performed in accordance with examples as disclosed herein. In some examples, aspects of the operations of 1115 may be performed by a mutation call component 835 as described with reference to FIG. 8.

At 1120, the method may include monitoring for an error corresponding to one or more of the set of multiple mutation calls. The operations of 1120 may be performed in accordance with examples as disclosed herein. In some examples, aspects of the operations of 1120 may be performed by an error monitoring component 850 as described with reference to FIG. 8.

At 1125, the method may include issuing, based on the orchestrating, one or more rollback calls invoking one or more rollback operations, wherein the annotated data schema further defines the one or more rollback operations for maintaining state consistency across the set of multiple data sources. The operations of 1125 may be performed in accordance with examples as disclosed herein. In some examples, aspects of the operations of 1125 may be performed by a rollback call component 855 as described with reference to FIG. 8.

Figure 12:
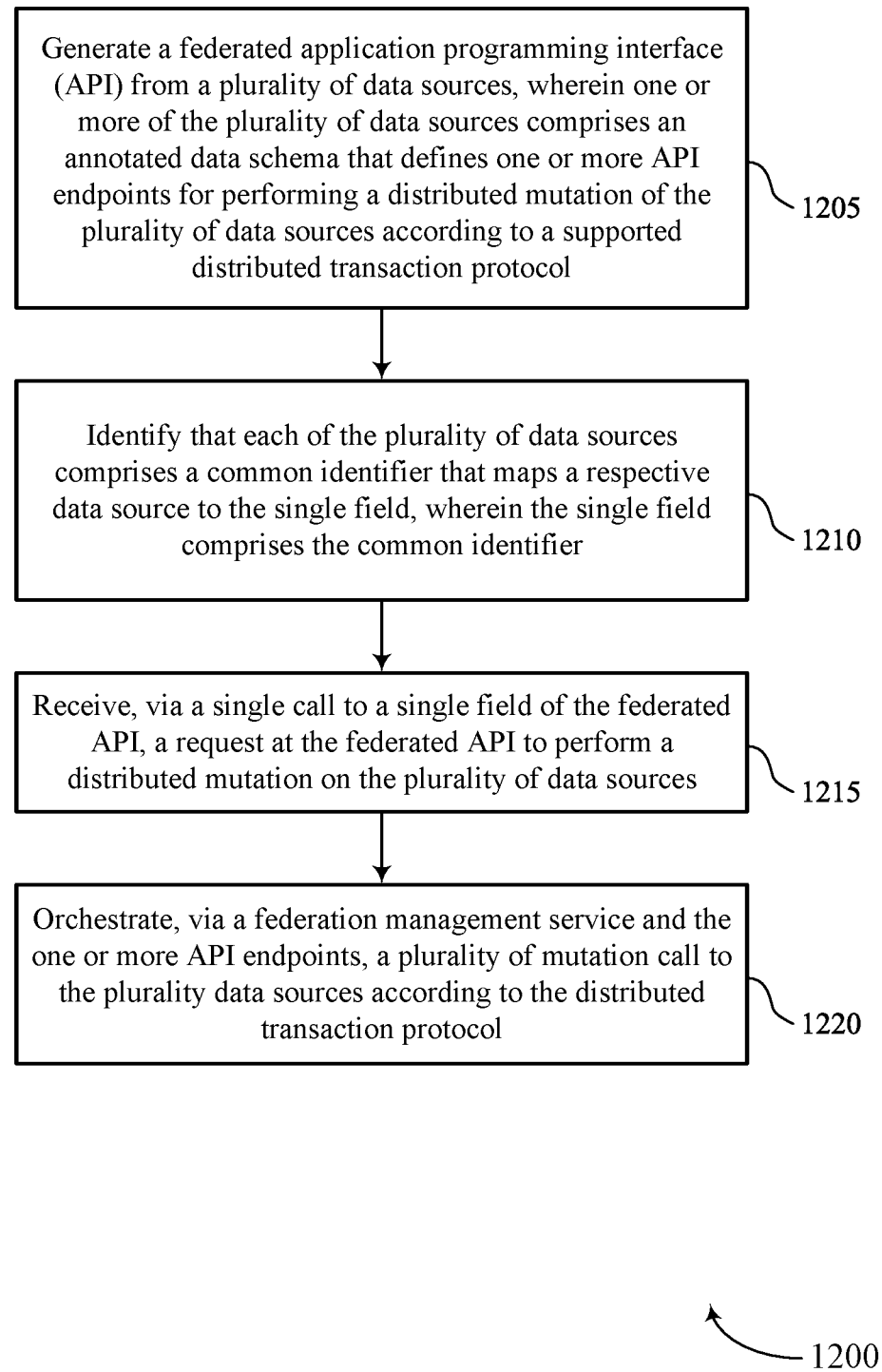

FIG. 12 shows a flowchart illustrating a method 1200 that supports federated distributed mutation in accordance with examples as disclosed herein. The operations of the method 1200 may be implemented by an application server or its components as described herein. For example, the operations of the method 1200 may be performed by an application server as described with reference to FIGS. 1 through 9. In some examples, an application server may execute a set of instructions to control the functional elements of the application server to perform the described functions. Additionally, or alternatively, the application server may perform aspects of the described functions using special-purpose hardware.

At 1205, the method may include generating a federated application programming interface (API) from a set of multiple data sources, where one or more of the set of multiple data sources includes an annotated data schema that defines one or more API endpoints for performing a distributed mutation of the set of multiple data sources according to a supported distributed transaction protocol. The operations of 1205 may be performed in accordance with examples as disclosed herein. In some examples, aspects of the operations of 1205 may be performed by a federated API generation component 825 as described with reference to FIG. 8.

At 1210, the method may include identifying that each of the set of multiple data sources includes a common identifier that maps a respective data source to the single field, where the single field includes the common identifier. The operations of 1210 may be performed in accordance with examples as disclosed herein. In some examples, aspects of the operations of 1210 may be performed by an annotated data schema component 840 as described with reference to FIG. 8.

At 1215, the method may include receiving, via a single call to a single field of the federated API, a request at the federated API to perform a distributed mutation on the set of multiple data sources. The operations of 1215 may be performed in accordance with examples as disclosed herein. In some examples, aspects of the operations of 1215 may be performed by a mutation call reception component 830 as described with reference to FIG. 8.

At 1220, the method may include orchestrating, via a federation management service and the one or more API endpoints, a set of multiple mutation calls to the plurality of data sources according to the distributed transaction protocol. The operations of 1220 may be performed in accordance with examples as disclosed herein. In some examples, aspects of the operations of 1220 may be performed by a mutation call component 835 as described with reference to FIG. 8.

A method for data processing is described. The method may include generating a federated application programming interface (API) from a set of multiple data sources, where one or more of the set of multiple data sources includes an annotated data schema that defines one or more access point (AP)I endpoints for performing a distributed mutation of the set of multiple data sources according to a supported distributed transaction protocol, receiving, via a single call to a single field of the federated API, a request at the federated API to perform a distributed mutation on the set of multiple data sources, and orchestrating, via a federation management service and the one or more API endpoints, a set of multiple mutation calls to the plurality of data sources according to the distributed transaction protocol.

An apparatus for data processing is described. The apparatus may include a processor, memory coupled with the processor, and instructions stored in the memory. The instructions may be executable by the processor to cause the apparatus to generate a federated application programming interface (API) from a set of multiple data sources, where one or more of the set of multiple data sources includes an annotated data schema that defines one or more API endpoints for performing a distributed mutation of the set of multiple data sources according to a supported distributed transaction protocol, receive, via a single call to a single field of the federated API, a request at the federated API to perform a distributed mutation on the set of multiple data sources, and orchestrating, via a federation management service and the one or more API endpoints, a set of multiple mutation call to the plurality of data sources according to the distributed transaction protocol.

Another apparatus for data processing is described. The apparatus may include means for generating a federated application programming interface (API) from a set of multiple data sources, where one or more of the set of multiple data sources includes an annotated data schema that defines one or more API endpoints for performing a distributed mutation of the set of multiple data sources according to a supported distributed transaction protocol, means for receiving, via a single call to a single field of the federated API, a request at the federated API to perform a distributed mutation on the set of multiple data sources, and means for orchestrating, via a federation management service and the one or more API endpoints, a set of multiple mutation calls to the plurality of data sources according to the distributed transaction protocol.

A non-transitory computer-readable medium storing code for data processing is described. The code may include instructions executable by a processor to generate a federated application programming interface (API) from a set of multiple data sources, where one or more of the set of multiple data sources includes an annotated data schema that defines one or more API endpoints for performing a distributed mutation of the set of multiple data sources according to a supported distributed transaction protocol, receive, via a single call to a single field of the federated API, a request at the federated API to perform a distributed mutation on the set of multiple data sources, and orchestrating, via a federation management service and the one or more API endpoints, a set of multiple mutation call to the plurality of data sources according to the distributed transaction protocol.

In some examples of the method, apparatuses, and non-transitory computer-readable medium described herein, the annotated data schema further defines one or more rollback operations for maintaining state consistency across the set of multiple data sources.

Some examples of the method, apparatuses, and non-transitory computer-readable medium described herein may further include operations, features, means, or instructions for monitoring for an error corresponding to one or more of the set of multiple mutation calls and issuing, based on the orchestrating, one or more rollback calls invoking the one or more rollback operations.

In some examples of the method, apparatuses, and non-transitory computer-readable medium described herein, the annotated data schema includes a path parameter that indicates a location of a rollback endpoint and an associated input for invoking the one or more rollback operations.

Some examples of the method, apparatuses, and non-transitory computer-readable medium described herein may further include operations, features, means, or instructions for generating the federated API includes identifying that each of the set of multiple data sources includes a common identifier that maps a respective data source to the single field, where the single field includes the common identifier.

In some examples of the method, apparatuses, and non-transitory computer-readable medium described herein, the annotated data schema includes a payload alias that identifies a respective data source for receiving a payload as part of the distributed mutation.

In some examples of the method, apparatuses, and non-transitory computer-readable medium described herein, the annotated data schema includes a path parameter that indicates a location of a transaction identifier.

Some examples of the method, apparatuses, and non-transitory computer-readable medium described herein may further include operations, features, means, or instructions for generating the federated API includes identifying that the set of multiple data sources each support the supported distributed transaction protocol based on the annotated data schema indicating support for the distributed transaction protocol.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
generating a federated application programming interface (API) from a plurality of data sources, wherein each of the plurality of data sources comprises a respective data schema that defines a respective pre-existing rollback operation associated with the data source;
generating, based at least in part on the respective data schemas, an annotated data schema associated with the federated API, wherein the annotated data schema defines one or more API endpoints for performing a distributed mutation of the plurality of data sources according to a supported distributed transaction protocol, and wherein the annotated data schema further defines one or more federated rollback operations for maintaining state consistency across the plurality of data sources based at least in part on the respective pre-existing rollback operations, and wherein the annotated data schema exposes, via a single field of the federated API, endpoints of the plurality of data sources for invoking the respective pre-existing rollback operations;

receiving, via a single call to a single field of the federated API, a request at the federated API to perform the distributed mutation on the plurality of data sources, wherein the distributed mutation comprises the one or more federated rollback operations; and orchestrating, via a federation management service and the one or more API endpoints, a plurality of mutation calls to the plurality of data sources according to the distributed transaction protocol.

2. The method of claim 1, further comprising:
monitoring for an error corresponding to one or more of the plurality of mutation calls; and
issuing, based at least in part on the orchestrating, one or more rollback calls invoking the one or more federated rollback operations.

3. The method of claim 1, wherein the annotated data schema comprises a path parameter that indicates a location of a rollback endpoint and an associated input for invoking the one or more federated rollback operations.

4. The method of claim 1, further comprising:
generating the federated API comprises identifying that each of the plurality of data sources comprises a common identifier that maps a respective data source to the single field, wherein the single field comprises the common identifier.

5. The method of claim 1, wherein the annotated data schema comprises a payload alias that identifies a respective data source for receiving a payload as part of the distributed mutation.

6. The method of claim 1, wherein the annotated data schema comprises a path parameter that indicates a location of a transaction identifier.

7. The method of claim 1, wherein generating the federated API comprises identifying that the plurality of data sources each support the supported distributed transaction protocol based at least in part on the annotated data schema indicating support for the distributed transaction protocol.

8. An apparatus for data processing, comprising:
a processor;
memory coupled with the processor; and
instructions stored in the memory and executable by the processor to cause the apparatus to:
generate a federated application programming interface (API) from a plurality of data sources, wherein each of the plurality of data sources comprises a respective data schema that defines a respective pre-existing rollback operation associated with the data source;
generate, based at least in part on the respective data schemas, an annotated data schema associated with the federated API, wherein the annotated data schema defines one or more API endpoints for performing a distributed mutation of the plurality of data sources according to a supported distributed transaction protocol, and wherein the annotated data schema further defines one or more federated rollback operations for maintaining state consistency across the plurality of data sources based at least in part on the respective pre-existing rollback operations, and wherein the annotated data schema exposes, via a single field of the federated API, endpoints of the plurality of data sources for invoking the respective pre-existing rollback operations;
receive, via a single call to a single field of the federated API, a request at the federated API to perform the distributed mutation on the plurality of data sources, wherein the distributed mutation comprises the one or more federated rollback operations; and
orchestrate, via a federation management service and the one or more API endpoints, a plurality of mutation calls to the plurality of data sources according to the distributed transaction protocol.

9. The apparatus of claim 8, wherein the instructions are further executable by the processor to cause the apparatus to:
monitor for an error corresponding to one or more of the plurality of mutation calls; and
issue, based at least in part on the orchestrating, one or more rollback calls invoking the one or more federated rollback operations.

10. The apparatus of claim 8 wherein the annotated data schema comprises a path parameter that indicates a location of a rollback endpoint and an associated input for invoking the one or more federated rollback operations.

11. The apparatus of claim 8, wherein the instructions to generate the federated API are further executable by the processor to cause the apparatus to:
identify that each of the plurality of data sources comprises a common identifier that maps a respective data source to the single field, wherein the single field comprises the common identifier.

12. The apparatus of claim 8, wherein the annotated data schema comprises a payload alias that identifies a respective data source for receiving a payload as part of the distributed mutation.

13. The apparatus of claim 8, wherein the annotated data schema comprises a path parameter that indicates a location of a transaction identifier.

14. The apparatus of claim 8, wherein the instructions to generate the federated API are further executable by the processor to cause the apparatus to:
identify that the plurality of data sources each support the supported distributed transaction protocol based at least in part on the annotated data schema indicating support for the distributed transaction protocol.

15. A non-transitory computer-readable medium storing code for data processing, the code comprising instructions executable by a processor to:
generate a federated application programming interface (API) from a plurality of data sources, wherein each of the plurality of data sources comprises a respective data schema that defines a respective pre-existing rollback operation associated with the data source;
generate, based at least in part on the respective data schemas, an annotated data schema associated with the federated API, wherein the annotated data schema defines one or more API endpoints for performing a distributed mutation of the plurality of data sources according to a supported distributed transaction protocol, and wherein the annotated data schema further defines one or more federated rollback operations for maintaining state consistency across the plurality of data sources based at least in part on the respective pre-existing rollback operations, and wherein the annotated data schema exposes, via a single field of the federated API, endpoints of the plurality of data sources for invoking the respective pre-existing rollback operations;

receive, via a single call to a single field of the federated API, a request at the federated API to perform the distributed mutation on the plurality of data sources, wherein the distributed mutation comprises the one or more federated rollback operations; and orchestrate, via a federation management service and the one or more API endpoints, a plurality of mutation calls to the plurality of data sources according to the distributed transaction protocol.

16. The non-transitory computer-readable medium of claim 15, wherein the instructions are further executable by the processor to:

monitor for an error corresponding to one or more of the plurality of mutation calls; and issue, based at least in part on the orchestrating, one or more rollback calls invoking the one or more rollback operations.

17. The non-transitory computer-readable medium of claim 15, wherein the instructions to generate the federated API are further executable by the processor to:

identify that each of the plurality of data sources comprises a common identifier that maps a respective data source to the single field, wherein the single field comprises the common identifier.

* * * * *